United States Patent

[11] 3,624,684

| [72] | Inventor | John G. McCaslin<br>Butte, Mont. |
|---|---|---|
| [21] | Appl. No. | 878,127 |
| [22] | Filed | Nov. 19, 1969 |
| [45] | Patented | Nov. 30, 1971 |
| [73] | Assignee | The United States of America as represented by the Secretary of the Interior |

[54] BOREHOLE DEFORMATION GAGE
7 Claims, 4 Drawing Figs.

[52] U.S. Cl. .................................................. 33/174,
33/178 F
[51] Int. Cl. ...................................................... G01b 7/10,
G01b 7/14, G01b 7/18
[50] Field of Search ............................................ 33/178 A,
178 F, 149 J, 174 A

[56] References Cited
UNITED STATES PATENTS

| 2,235,533 | 3/1941 | Roberts | 33/178 E |
| 2,325,299 | 7/1943 | Bench | 33/178 R |
| 2,495,797 | 1/1950 | Whitlock | 33/178 E |
| 2,614,164 | 10/1952 | Huston | 33/178 F |
| 2,736,967 | 3/1956 | Doll | 33/178 F |
| 3,474,541 | 10/1969 | Cubberly | 33/178 F |

Primary Examiner—Leonard Forman
Assistant Examiner—Paul G. Foldes
Attorneys—Ernest S. Cohen and Gersten Sadowsky ABSTRACT: LVDT transducers in a deformation gauge respond to deformation stimuli for measuring subsurface stress patterns along multiple radial lines in a single plane perpendicular to the longitudinal axis of a borehole. The transducers are symmetrically grouped in a semicircular pattern and spaced along the axis of the gauge so that a maximum number of transducers fit within a small diameter. Similarly proportioned cantilever arms transmit deformation stimuli from the measurement plane to the spaced transducers. Stimuli of equal strength, because of the cantilever arm proportions, have the same effect on all transducers, regardless of the distance between the transducer and measurement plane.

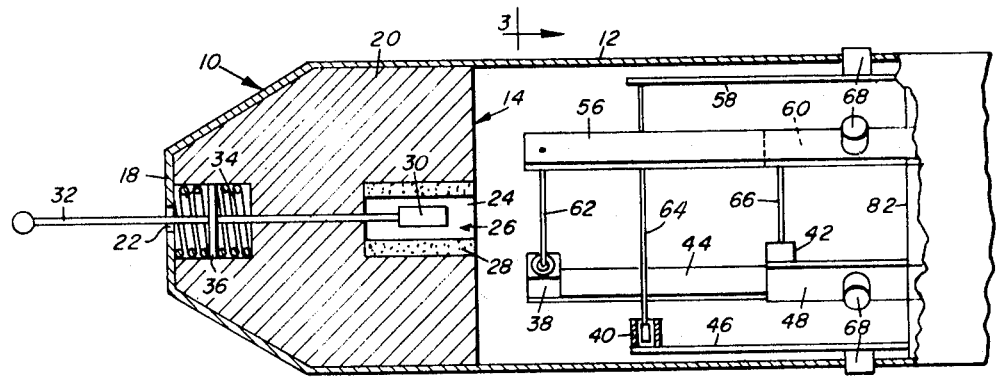
FIG.1
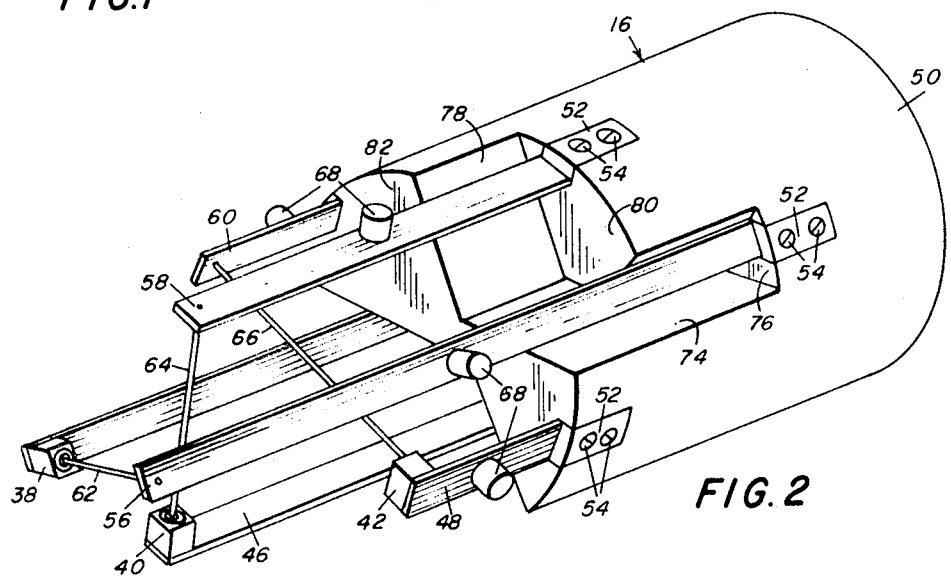
FIG.2
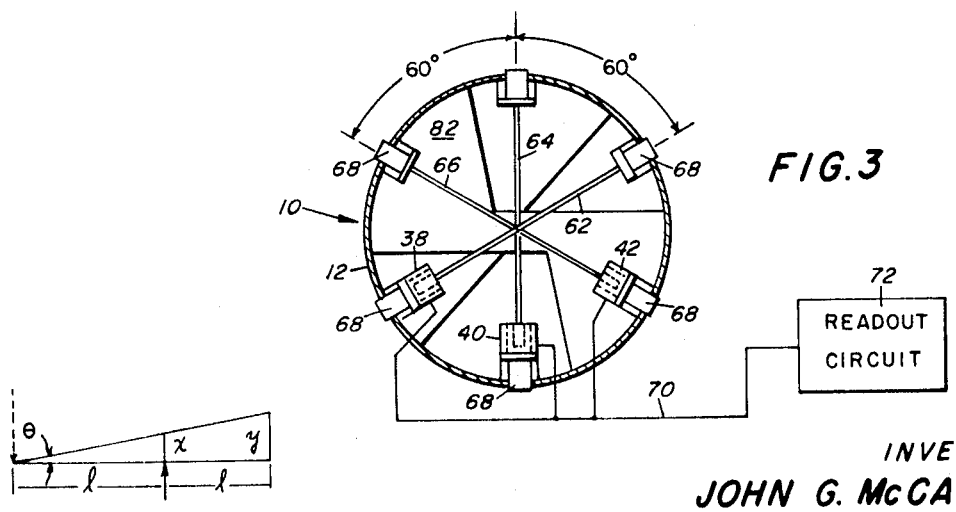
FIG.3
FIG.4
INVENTOR
JOHN G. McCASLIN
BY Ernest S. Cohen
Gersten Sadowsky
ATTORNEY

BOREHOLE DEFORMATION GAGE

BACKGROUND OF THE INVENTION

Borehole deformation analysis is a basic method for determining stress characteristics of subsurface geological formations. By measuring the magnitude and direction of strain induced by stresses acting upon a borehole wall, the physical structure of surrounding rock formations can be determined and the effects of artificial structures or excavations can be predicted.

Accurate deformation analysis requires a determination of strain is several directions within a borehole. For convenience in measurement and computation, strain is generally measured in directions perpendicular to the borehole wall along radial lines originating at the longitudinal borehole axis. Because rock formations are generally heterogeneous, the most accurate interrelationship of stress forces in the formation is achieved when the several directions of strain measurement lie in a single plane. When measured in this configuration, strain represents the uniform effect of forces acting upon a single point. Correlation of these effects for spaced points along the borehole axis yields a representation of three-dimensional stress relationships within the formation.

Prior art deformation gauges are available for measuring strain along multiple lines in a single plane perpendicular to a borehole axis. Typically, electrical resistance strain gauges are used in these instruments to convert strain displacement into an electrical analogue signal. The dimensions and configuration of these strain gauges facilitate orientation of their sensing pickups in a single radial plane. But, notwithstanding their mechanical adaptability, resistance strain gauges exhibit electrical characteristics which are difficult to control in the varying environments encountered in borehole deformation analysis. As a result, the popularity of electrical resistance strain gauges for deformation measurement has decreased, and they are being supplanted by more accurate and predictable linear variable differential transformer (LVDT) transducers.

LVDT transducers are small, lightweight, and electrically stable. These properties make them ideal for use in borehole deformation gauges. One gauge of this type was described by James R. Perrin and James J. Scott in a publication titled: The White Pine LVDT Biaxial Borehole Deformation Gauge; Proceedings of the Sixth Symposium on Rock Mechanics; University of Missouri at Rolla, Mo.; 1964, on pages 749–773. Yet, in spite of the electrical superiority of LVDT transducers, their measurement potential for deformation analysis was not fully realized by the prior art. Because of the physical LVDT structure, prior LVDT deformation gauges were unable to measure multiple lines of force in a single plane perpendicular to a borehole axis. This resulted from the physical difficulty of orienting three of more LVDT sensors in an angular array in a single plane through the longitudinal axis of a borehole deformation gauge. Since the sensors are too large to be oriented in a single plane within the narrow diameter required for a borehole gauge, readings were taken simultaneously in spaced planes, and measurement accuracy was correspondingly decreased. With the borehole deformation gauge of this invention this undesirable loss of accuracy is avoided.

SUMMARY OF THE INVENTION

This invention is a gauge for measuring deformation of a borehole within a geological formation. Linear variable differential transformer (LVDT) transducers in the gauge transform deformation stimuli into representative electrical signals. Each LVDT transducer includes a core and a coil mounted for relative displacement on opposing cantilevered arms within the gauge. When deformation flexes the arms by pressing against or moving away from contact pins mounted near their midpoints, the LVDT cores move within the coils, changing electrical output signals. The changed signals represent borehole deformation.

In order to measure lateral deformation in multiple directions within a single plane through a borehole, a series of cantilever arms and attached LVDT transducers are symmetrically spaced in a semicircular pattern within the gauge. Mechanical interference between the LVDT transducers on the ends of the cantilever arms is avoided by staggering the lengths of the arms so that each LVDT is in a different plane perpendicular to the longitudinal axis of the gauge. Contact pins connected to the arms for sensing deformation stimuli are aligned in a single plane so that deformation is sensed in only one plane. Uniform electrical readout for equal depressions of the different length cantilever arms is achieved by spacing each contact pin on its supporting arm the same proportional distance from the fulcrum plane of the arm in relation to the total effective length of the arm. In one embodiment of this relationship the fulcrum planes of the cantilever arms are spaced along the longitudinal axis of the gauge by the same distance apart as are the alignment planes of the LVDT transducers.

Longitudinal borehole deformation is measured by an LVDT transducer and probe aligned with the longitudinal axis of the gauge. The result is a repetitively accurate deformation gauge which can be adapted to fit in very small diameter boreholes.

Therefore, one object of this invention is a borehole deformation gauge for measuring longitudinal and lateral borehole deformation.

Another object of this invention is a compact deformation gauge for measuring deformation along multiple directions in a single plane perpendicular to a borehole axis.

Still another object of this invention is a compact arrangement of LVDT transducers in a sensing element of a borehole deformation gauge.

These and other objects of this invention will become more apparent with reference to the following specification and drawing in which:

BRIEF DESCRIPTION OF THE DRAWING

FIG. 1 is a lateral view of the sensing portion of a borehole deformation gauge in partial section, and with a protective casing partially cut away.

FIG. 2 is a perspective view of a sensing element shown particularly in FIG. 1.

FIG. 3 is a sectional view taken along lines 3—3 of FIG. 1.

FIG. 4 is a diagrammatic representation of a cantilever arm shown in detail in FIG. 2.

DESCRIPTION OF THE PREFERRED EMBODIMENT

A borehole deformation gauge 10 is shown in FIG. 1. Structure for positioning and anchoring the gauge within a borehole is omitted from the figure, since this structure forms no part of the invention and is well known in the art. The anterior portion of the gauge 10, shown in FIG. 1 with a portion of a tubular casing 12 cut away for clarity, contains sensing elements which contact a borehole wall for transforming deformation stimuli into electrical analog signals. This anterior portion is inserted first into a borehole, with the positioning and anchoring portion of the gauge following behind.

Within the closed tubular casing 12, forming the outer shell of the gauge 10, are located longitudinal and lateral sensing elements 14 and 16. The longitudinal sensing element 14 is anchored adjacent to the front end 18 of the gauge 10 by a chassis block 20. Axial cavities 22 and 24 extend into opposite ends of the block 20 an alignment with a narrow axial hole extending completely through the block. The posterior cavity 24 contains an LVDT transducer 26, including a fixed sensing coil 28 and a movable core 30. The core 30 is attached to one end of a sensing probe 32 extending freely through the block 20 and cavity 22, and out of an aperture in the front end 18 of the gauge 10. In operation, the end of the sensing probe 32 is anchored near the bottom end of a borehole. Longitudinal movement of surrounding geological formations are transmitted through the probe to the LVDT transducer 26. A pair of springs 34 on opposite sides of a disc 36 fixed to the probe 32 bias the probe in a neutral position for initial positioning of the gauge. When the probe 32 and tubular casing 12 are independently anchored, relative movement between them is converted by the LVDT transducer to a representative electrical signal and transmitted to a readout circuit by a connecting cable (not shown).

The lateral sensing element 16, shown in detail in FIG. 2, is positioned in the gauge 10 to the rear of the longitudinal sensing element 14, as shown in FIG. 1. Lateral deformation in a plane perpendicular to the longitudinal axis of the gauge 10 is detected by three LVDT transducers 38-42 spaced from one another in a semicircular pattern. The sensors are supported by the free ends of three cantilever arms 44-48, recessed in peripheral slots on a cylinder chassis 50. Each arm is recessed below the outer surface of chassis 50 and held by a spacing block 52 and fasteners 54. When the lateral sensing element 16 is positioned within the tubular casing 12, the chassis 50 fits closely against the inner casing wall, and each cantilever arm is slightly spaced from the wall. In this position the cantilever arms are free to move toward and away form the wall, with each pair of arms moving in a different longitudinal plane intersecting the longitudinal axis of the gauge 10.

Diametrically opposite each cantilever arm 44-48 on the sensing element 16 there is another cantilever arm 56-60, respectively, of similar construction. Core extension shafts 62-66 extend perpendicularly from the free ends of these other arms 56-60, terminating in alignment with the LVDT transducers on the corresponding arms on the opposite side of the element 16. On the end of each shaft an LVDT core translates freely within an LVDT coil, as best seen in FIG. 3. Radial movement of either arm of a cantilever pair translates a core within a corresponding coil, altering the electrical properties of the LVDT transducer in a manner well known in the art.

Cylindrical contact pins 68 on the outer surface of each cantilever arm extend freely through radial openings and a short distance beyond the outer wall of the casing 12 to communicate with a borehole wall. When the deformation gauge 10 is inserted within a borehole, the contact pins are depressed slightly toward the casing to bias them for outward movement. Expansion or compression of the borehole is transmitted by the contact pins 68, to the cantilevered arms and ultimately to the individual LVDT transducers. As a core translates within an LVDT coil, variations in electrical output are transmitted through connecting cables 70 to a readout circuit 72 of conventional design. In this way lateral displacements of the borehole wall are transformed into representative readout indications.

While the pairs of cantilever arms 44-48 and 56-60, and associated contact pins 68 can be positioned in arbitrary positions relative to one another the positioning shown in FIGS. 1-3 has proved to be particularly advantageous. For optimum accuracy, measurement of lateral deformation is a single plane perpendicular to a borehole axis is most effective. The contact pins are, therefore, positioned in a single plane perpendicular to the longitudinal axis of the gauge 10. The contact pins are spaced circumferentially from one another with a 60° angle between adjacent pins, as shown in FIG. 3, to yield a symmetrical deformation representation.

Although, for descriptive convenience, the gauge 10 as shown in FIG. 3 is of sufficient diameter to accommodate the three LVDT transducers in a single plane, in actual practice much smaller standard borehole gauge diameters of the order of 1.4 inches are required. This small diameter prevents alignment of the sensors in a single plane. In prior devices this limitation also prevented alignment of the contact pins in a single plane. This limitation has been overcome by staggering the lengths of the cantilever arms so that each LVDT transducer is in a different plane perpendicular to the longitudinal axis of the gauge 10. The position of each cantilever arm, and the position of the contact pin relative to the arm is designed so that, for a given contact pin displacement, the mechanical effect upon each LVDT transducer is the same, regardless of the length of the arm affected. A description of the critical design parameters will clarify this relationship.

In FIG. 4 at right triangle is shown with a base dimension ($2l$) representing the effective length of a cantilever arm between the fulcrum plane and core extension shaft. A dotted arrow pointing downward represents the fulcrum plane of the arm, while a solid arrow pointing upward represents a contact pin acting upon the arm at a distance ($l$) from the fulcrum plane. For a small displacement of the contact pin in an upward direction, the length of pin displacement is related to the distance ($l$) between the pin and the fulcrum plane, and to the angle ($\theta$) between the original and final positions of the arm by the equation:

$$(1) \quad x = l \tan \theta$$

Similarly the distance ($y$) travelled by the end of the cantilever arm is:

$$(2) \quad y = 2l \tan \theta$$

Combining equations (1) and (2) yields the relation:

$$(3) \quad y = 2x$$

It is apparent that displacement of the contact pin causes a fixed proportional displacement of the end of the cantilever arm, regardless of the length of the arm. For different length cantilever arms the end of each arm will move the same distance for a given contact pin displacement if the contact pin on each arm is positioned the same proportional distance away from the fulcrum plane in relation to the length of the arm. The distance ($y$) moved by the LVDT core connected to the arm depends only upon the ratio of the distance between the cantilever fulcrum plane and contact pin, to the distance between the contact pin and attachment point of the LVDT core. By varying this ratio the distance ($y$) travelled by the core for a displacement ($x$) of the contact pin is increased or decreased. For a ratio of 1:2 the core displacement is three times the contact pin displacement, with a corresponding increase in measurement sensitivity. Since the core actually moves in an arc a very small error exists, but for the small angles encountered the error is negligible.

In the lateral sensing element shown in FIG. 2 there are three different length cantilever arms grouped in opposing pairs. The longest pair of arms 44 and 56 extends into long recessed slots 74 on opposite sides of the cylindrical chassis 50. A contact pin 68 is connected to each arm at a distinct location midway between the fulcrum plane 76 and the LVDT core attachment point. An intermediate length pair of cantilever arms 46 and 58 similarly extend into intermediate length recessed slots 78. The fulcrum plane 80 of the intermediate length arms is spaced in an axial direction from the fulcrum plane 76 of the longer slots so that the midpoints of the long and intermediate arms align in the same plane perpendicular to the longitudinal axis of the gauge 10. In a similar manner, a short pair of cantilever arms 48 and 60 flex about the end face 82 of chassis 50 with their midpoint in the plane occupied by the midpoints of the other arms. Because each pair of cantilever arms is a different length, the LVDT transducers and core extension rods mounted near their ends are spaced from one another along the axis of the gauge. This spacing allows a much smaller diameter borehole deformation gauge than possible when all the LVDT sensors are mounted in a single plane.

While the preferred embodiment of the invention has been shown and described, modifications within the scope of this disclosure are to be expected for adapting the invention to diverse measurement environments. More LVDT transducers than shown may be used for increased resolution. The relation of cantilever arm length to contact pin position can be changed to increase or decrease sensitivity of the gauge. Equivalent contacts can be substituted for the contact pins shown. Radial measurement can be substituted for diametric measurement by fixing either a coil or core of a transducer to a rigid support. These and other modifications of the invention within the scope of the following claims will be apparent to those of ordinary skill in the art.

What is claimed is:

1. In a borehole deformation gauge having LVDT transducers positioned in a substantially tubular casing in alignment with different longitudinal planes radiating from a longitudinal axis of the casing, and having contacts interconnecting with the LVDT transducers for measuring deformation acting along different radial lines within a borehole, the improvement comprising:
   a plurality of pivotally mounted cantilever arms positioned within the casing,
   a plurality of contact means arranged in alignment with a single plane perpendicular to the longitudinal axis, each contact means extending through the casing and positioned for interconnecting a small area of a borehole wall with one of the plurality of cantilever arms for pivoting the one arm toward and away from the longitudinal axis when deformation of the borehole occurs,
   a plurality of LVDT transducers positioned within the casing and spaced from one another in the direction of the longitudinal axis, and each transducer including a relatively movable coil and core, and
   means interconnecting each LVDT transducer with a cantilever arm for relative movement between the coil and core of the transducer when the cantilever arm is pivoted in response to deformation.

2. A borehole deformation gauge as claimed in claim 1 in which:
   each contact means contacts the one of the plurality of cantilever arms at a distance from a fulcrum plane of the cantilever arm which has the same proportional relationship to the total effective length of the cantilever arm for all cantilever arms and contact means, and the fulcrum planes of at least two cantilever arms are displaced from one another in the direction of the longitudinal axis.

3. A borehole deformation gauge as claimed in claim 2 in which:
   the coil and core of each LVDT transducer are each independently connected to different cantilever arms which have a common fulcrum plane and are positioned on opposite sides of the longitudinal axis in alignment with a single longitudinal plane extending through the axis.

4. In a borehole deformation gauge having LVDT transducers positioned in a substantially tubular casing, and having external contacts interconnecting with the LVDT transducers for measuring deformation within a borehole, the improvement comprising a sensing element including:
   a rigid support having a longitudinal axis,
   a plurality of cantilever arms arranged in an arcuate array, each arm fixed at one end to the support and extending outward from a fulcrum plane on the support in a direction substantially parallel to the longitudinal axis with the fulcrum planes of at least two cantilever arms displaced from one another along the longitudinal axis,
   a plurality of LVDT transducers mounted substantially within the arc defined by the plurality of cantilever arms and spaced in the direction of the longitudinal axis, each transducer including a relatively movable coil and core,
   means for relatively moving the coils and cores of the LVDT transducers in response to flexing movement of the cantilever arms, and
   a plurality of contact means arranged in an arcuate array in alignment with a single plane perpendicular to the longitudinal axis, each contact means connecting with a distinct location on a cantilever arm for flexing the arm in response to an external deformation, the distance of the distinct location on a cantilever arm from the fulcrum plane of the arm having the same proportional relationship to the total effective length of the arm for all cantilever arms,
   whereby a mechanical deformation affecting a contact means produces the same effect in the associated LVDT transducer, regardless of the length of the cantilever arm through which the stimulus is transmitted.

5. A sensing element as claimed in claim 4 in which:
   the coil of at least one LVDT transducer is fixed relative to the rigid support, and the core is connected to move with a cantilever arm for movement of the core relative to the coil as the cantilever arm flexes, 6. A sensing element as claimed in claim 4 in which:
   the core of at least one LVDT transducer is fixed relative to the rigid support and the coil is connected to move with a cantilever arm for movement of the coil relative to the core as the cantilever arm flexes.

7. A sensing element as claimed in claim 4 in which:
   the coil of at least one LVDT transducer is connected to one cantilever arm and the core of the same transducer is connected to another cantilever arm aligned in the same plane with the one arm and the longitudinal axis, with the longitudinal axis extending between the one and the other cantilever arms.

* * * * *